Jan. 22, 1974     J. P. HARRIS ET AL     3,787,548

METHOD OF APPLYING PRESSURE SENSITIVE ADHESIVE TO AN ARTICLE

Filed Dec. 24, 1970

INVENTORS
James P. Harris
BY   & Seymour Katz

George A. Grove
ATTORNEY

United States Patent Office 3,787,548
Patented Jan. 22, 1974

3,787,548
METHOD OF APPLYING PRESSURE SENSITIVE ADHESIVE TO AN ARTICLE
James P. Harris, Troy, and Seymour Katz, Oak Park, Mich., assignors to General Motors Corporation, Detroit, Mich.
Filed Dec. 24, 1970, Ser. No. 101,259
Int. Cl. B29c 1/04
U.S. Cl. 264—259
2 Claims

ABSTRACT OF THE DISCLOSURE

In a preferred embodiment a uniform film of tacky, pressure sensitive adhesive is applied to an article by employing a special mold having a porous cavity defining member arranged and constructed to receive a predetermined amount of pressure sensitive adhesive and at least the surface of the article to be coated, and a reservoir beneath the porous member; introducing a liquid into the reservoir in which the pressure sensitive adhesive is insoluble under sufficient pressure to cause the liquid to flow through the porous member and form a liquid film on the cavity surface; placing a predetermined amount of pressure sensitive adhesive in the mold cavity and then placing the article to be coated into the cavity against the adhesive. The adhesive is molded into a thin film against the surface to be coated and adheres thereto but does not stick to the mold because it will not wet the liquid film.

---

Figure 1:
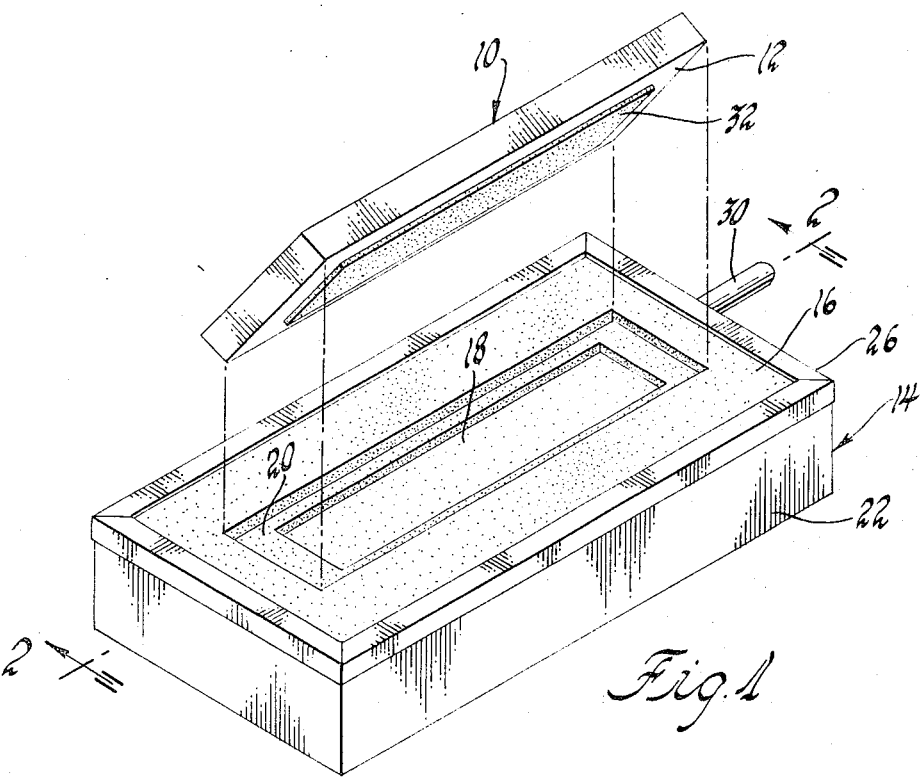

This invention relates to the problem of applying a pressure sensitive adhesive to a surface of an article. More specifically, this invention relates to a method of molding a pressure sensitive adhesive in a uniform thin film on the surface of an article such that the adhesive adheres to the article and not to the mold.

Pressure sensitive adhesives are finding increased usage in commerce in situations which heretofore have required mechanical connectors. Nameplates, emblems, mold strips and like members are bonded to automobiles, domestic appliances or other articles of manufacture by means of pressure sensitive adhesives thereby eliminating the need for an endless variety of rivets, nuts, bolts and like connectors.

Frequently, however, it is difficult to apply pressure sensitive adhesives in uniform, thin films to relatively small or irregularly shaped articles other than by hand. The particularly desirable property of pressure sensitive adhesives, their tackiness or stickiness, makes it difficult to apply them to a small or irregularly shaped surface without having adhesive stick to adjacent surfaces. If the adhesive is carefully applied by hand to just those surfaces which are intended to be coated the operation is a slow, time consuming job. Higher speed mechanized adhesive application operations typically result in the adhesive sticking to surfaces not intended to be coated and creating a mess, and in the formation of a nonuniform film.

Accordingly, it is an object of the present invention to provide a method of molding a uniform, relatively thin film of pressure sensitive adhesive to a desired surface of an article.

It is a more specific object of the present invention to provide a method of molding a pressure sensitive adhesive film onto a surface of an article, in which method a liquid film in which the pressure sensitive adhesive is not soluble is maintained on cavity defining surfaces of the mold to prevent the adhesive from sticking to the mold or to surfaces of the article not intended to be coated.

In accordance with a preferred embodiment of our invention, these and other objects are accomplished by first providing a mold having a porous mold surface member adjacent to, or otherwise in communication with a liquid reservoir. In general, the porous mold member is arranged and constructed to define a mold cavity, or interconnecting mold cavities, into which a measured quantity of pressure sensitive adhesive may first be placed, and into which is placed at least the surface to be coated of an article. A liquid nonsolvent with respect to the pressure sensitive adhesive is introduced into the reservoir, which preferably is located at the back side of the porous mold member, under sufficient pressure to force the liquid through the porous member to form a thin liquid film on at least the cavity walls of the mold member. Sufficient pressure is kept on the liquid to maintain the film on the cavity surface throughout adhesive coating operations.

A measured quantity of adhesive is placed in the mold cavity and the part to be coated is then placed into the mold cavity against the adhesive. The adhesive is molded into a thin film and adheres only to the desired surface of the article exposed to the adhesive in the mold cavity. The adhesive does not wet the liquid film-coated mold surface and, therefore, no adhesive remains in the mold at the completion of a coating cycle. It will be recognized that mechanical means may readily be employed to introduce adhesive into the mold and to introduce and remove the part to be coated. Once a porous mold member of suitable cavity defining configuration has been prepared it may be used to rapidly coat a number of parts with an adhesive. During each coating operation all of the adhesive ends up on the part in a desired pattern and does not remain in the mold itself.

Figure 2:
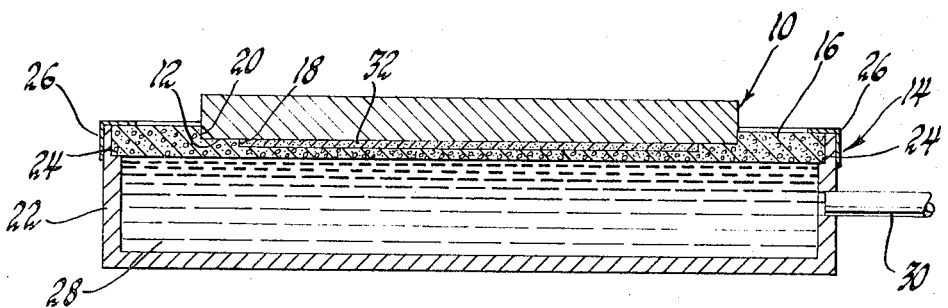

These and other objects and advantages of our invention will become more apparent from a detailed description thereof. Reference may be made to the drawing, in which:

FIG. 1 is an exploded, perspective view showing a mold and an adhesive coated part; and FIG. 2 is a sectional view along plane 2—2 of FIG. 1 with the part and adhesive film shown in the mold cavity.

For purposes of illustration a relatively small automobile emblem 10 of simple configuration is to be coated with a uniformly thin film of pressure sensitive adhesive on surface 12. A composite mold 14 is provided having a porous, cavity defining mold body member 16 as shown in FIGS. 1 and 2. Mold body member 16 may suitably be formed of sintered metal particles, sintered glass particles, sintered ceramic particles, or any other suitable porous material which has sufficient structural integrity to be self-sustaining and which may be molded or machined into a desired configuration.

A particularly suitable porous mold body member may be made of an open cell metal foam. One method of forming such foams is to provide a reticulated urethane foam substrate, electroplate a suitable metal, such as nickel, onto the substrate and, if desired, remove the substrate by thermal decomposition. Metal foams of this type and a method of their preparation is described in Materials Engineering, April 1968, pp. 44–46.

The mold body member 16 is arranged and constructed to define a cavity, or interconnecting cavities, to admit a desired quantity of pressure sensitive adhesive and at least the surface to be coated of an article therein. As best seen in FIG. 1 mold body member 16 has a first, relatively small cavity 18 adjoining and interconnected with a larger cavity 20. Mold body 16 is supported and carried in a mold frame member 22, the mold body 16 being supported on shoulders 24 of the mold frame member 22. Mold body 16 is held in place on the shoulders 24 of mold frame 22 by a suitable collar 26. Frame member 22 is arranged and constructed to provide a reservoir beneath mold member 16 and adjoining the back side thereof, into which reservoir a liquid 28 may be introduced. Inlet means 30 is provided in frame 22 for introduction of the liquid.

Liquid 28 is a nonsolvent with respect to the pressure sensitive adhesive to be used. A dilute solution of soap in water is a suitable nonsolvent liquid for most pressure sensitive adhesives. The nonsolvent liquid 28 is maintained under sufficient pressure by any suitable means, not shown, to cause the liquid to permeate porous mold body member 16 and form a film of the liquid on at least the surfaces thereof which define cavities 18 and 20.

A relatively small, predetermined quantity of pressure sensitive adhesive, for example, a silicone type pressure sensitive adhesive, is introduced into cavity 18. The adhesive mass does not have to precisely fit the outline of cavity 18. Article 10, with surface 12 downward, is then pressed into cavity 20 either by hand or by any suitable mechanical handling means, not shown, whereby the pressure sensitive adhesive is pressed and molded into the configuration defined by cavity 18 and adjacent surface 12 of article 10, and adheres only to the exposed portion of surface 12 of the article 10. As shown in FIGS. 1 and 2, in the instance of this example the adhesive is simply molded into a thin adhesive film 32 of uniform thickness and rectangular configuration. However, a porous mold member can readily be prepared to define a cavity in which an adhesive film could be molded into virtually any desired configuration. Films of such complicated configurations as numerals and script may be formed in accordance with our process. The adhesive film readily sticks to the surface of the article to be coated. However, due to the presence of the nonsolvent liquid film on the surface of the porous mold body 16, the pressure sensitive adhesive neither wets nor sticks to the mold.

In general, our method may be used in applying any pressure sensitive adhesive to a surface of an article. Typical pressure sensitive adhesives of present commercial interest are based on acrylic resins, natural rubber, silicone resins and other synthetic elastomers and resins. Their precise chemical composition is not critical to the practice of our invention. In general, pressure sensitive adhesives are two-phase systems having a high molecular weight resin as a continuous film forming phase with a dispersed phase of lower molecular weight resin for tackiness. The respective solubilities of such adhesives in many liquids of varying chemical composition is known. It is well within the skill of a chemist to select a liquid in which a particular adhesive is quite insoluble and which liquid will readily permeate a porous mold member. We have found that a dilute solution of soap in water is a suitable nonsolvent liquid for use with most pressure sensitive adhesives. The soapy water readily permeates the porous mold, but the adhesive neither dissolves in nor wets the resulting aqueous film.

We have found our process to be particularly useful in applying silicone pressure sensitive adhesives. Typically, these adhesives are mixtures of silicone elastomers of the poly(dimethyl siloxane) type having a spread in molecular weights to provide both the continuous film and the dispersed tacky properties. The adhesives are typically supplied as viscous xylene solutions (60% silicone solids). Fillers, crosslinking agents are added to the adhesives, if desired, to provide a formulation which is added in a suitable quantity to a porous mold and applied to the surface of an article by our process. After the article has been coated with an adhesive film in accordance with our process it may be heated to remove solvent and effect some crosslinking, if desired, of the adhesive resin. Thereafter the adhesive coated article may be readily pressed against another surface and bonded thereto.

While our invention has been described in terms of a preferred embodiment thereof it will be appreciated that other forms may be readily adapted by one skilled in the art. Therefore, our invention is to be limited only by the scope of the following claims.

What is claimed is:

1. A method of applying a film of a silicone type pressure sensitive adhesive of uniform thickness to a surface of an article in a desired pattern comprising
   providing a mold having a rigid porous metal cavity defining member arranged and constructed on an outer surface thereof to define a first cavity portion for admitting a quantity of a said pressure sensitive adhesive and a second cavity portion in unobstructed communication with said first cavity portion for admitting at least the surface of said article which is to be coated, and a reservoir member adjacent said porous member at the surface opposite said outer surface,
   introducing an aqueous soap solution into said reservoir under sufficient pressure to just force said solution through said porous member and form a film of said soap solution on the surface of said cavity defining portions,
   placing a predetermined quantity of a silicone elastomer pressure sensitive adhesive in said first cavity portion,
   placing said article in said second cavity portion juxtaposing said surface to be coated against said pressure sensitive adhesive whereby a film of said pressure sensitive adhesive of uniform thickness is molded against and caused to adhere to said surface in a desired pattern,
   and removing the adhesive coated article from said mold there being substantially no residual adhesive sticking to said mold.

2. A method of applying a film of a pressure sensitive adhesive of uniform thickness to a surface of an article in a desired pattern comprising
   providing a mold having a rigid porous cavity defining member arranged and constructed on an outer surface thereof to define a first cavity portion for admitting a quantity of a said pressure sensitive adhesive and a second cavity portion in unobstructed communication with said first cavity portion for admitting at least the surface of said article which is to be coated, and a reservoir member adjacent said porous member at the surface opposite said outer surface,
   introducing an aqueous soap solution into said reservoir under sufficient pressure to just force said solution through said porous member and form a film of said soap solution on the surface of said cavity defining portions,
   placing a predetermined quantity of a said pressure sensitive adhesive in said first cavity portion,
   placing said article in said second cavity portion juxtaposing said surface to be coated against said pressure sensitive adhesive whereby a film of said pressure sensitive adhesive of uniform thickness is molded against and caused to adhere to said surface in a desired pattern,
   and removing the adhesive coated article from said mold there being substantially no residual adhesive sticking to said mold.

(References on following page)

References Cited

UNITED STATES PATENTS

| | | | |
|---|---|---|---|
| 3,417,175 | 12/1968 | Brown et al. | 161—167 |
| 3,525,783 | 8/1970 | Prikkel III | 264—338 |
| 3,304,577 | 2/1967 | Mott | 25 —Dig. 15 |
| 3,284,248 | 11/1966 | Rumberger | 264—338 |
| 3,464,842 | 9/1969 | Jackstadt | 161—167 |
| Re. 8,431 | 9/1878 | Wheeler | 117—47 R |
| 2,333,369 | 11/1943 | Glicknan | 118—203 |
| 2,378,900 | 6/1945 | Adams | 117—111 R |
| 2,424,386 | 7/1947 | Czeczowitzka | 117—47 R |
| 2,657,151 | 10/1953 | Genzel et al. | 117—47 R |
| 2,985,178 | 5/1961 | Christensen | 118—203 X |
| 3,349,749 | 10/1967 | Utschig | 117—111 R X |
| 3,453,138 | 7/1969 | Chen et al. | 117—111 R |
| 2,457,114 | 12/1948 | Amenta | 264—338 X |

OTHER REFERENCES

Skeist: Handbook of Adhesives, Reinhold, New York (1962), p. 459 relied on.

Alexander et al.: Colloid Chemistry Theoretical and Applied, Reinhold, New York (1946), p. 288 relied on.

Randolph et al.: Plastics Engineering Handbook, Reinhold, New York (1960), p. 180 relied on.

Skeist, Irv.: Handbook of Adhesives, Reinhold, New York (1962), pp. 464–466 relied on.

ROBERT F. WHITE, Primary Examiner

W. E. HOAG, Assistant Examiner